(12) United States Patent
Avendano et al.

(10) Patent No.: US 9,210,503 B2
(45) Date of Patent: Dec. 8, 2015

(54) AUDIO ZOOM

(75) Inventors: Carlos Avendano, Campbell, CA (US);
Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 239 days.

(21) Appl. No.: 12/896,725

(22) Filed: Oct. 1, 2010

(65) Prior Publication Data

US 2011/0129095 A1  Jun. 2, 2011

Related U.S. Application Data

(60) Provisional application No. 61/266,131, filed on Dec. 2, 2009.

(51) Int. Cl.
| | | |
|---|---|---|
| *H03G 3/00* | (2006.01) | |
| *H04R 3/00* | (2006.01) | |
| *H04M 1/03* | (2006.01) | |

(52) U.S. Cl.
CPC ............... *H04R 3/005* (2013.01); *H04M 1/03* (2013.01); *H04R 2430/20* (2013.01); *H04R 2430/21* (2013.01)

(58) Field of Classification Search
CPC ............. H04R 3/005; H04R 2430/20; H04R 2430/21; H04R 2430/23; H04R 2430/25
USPC ............ 381/63, 92, 61, 94.1–94.4; 348/14.02
See application file for complete search history.

(56) References Cited

U.S. PATENT DOCUMENTS

| | | | | |
|---|---|---|---|---|
| 4,969,203 | A * | 11/1990 | Herman | 382/266 |
| 5,555,306 | A * | 9/1996 | Gerzon | 381/63 |
| 6,188,769 | B1 * | 2/2001 | Jot et al. | 381/63 |
| 7,548,791 | B1 * | 6/2009 | Johnston | 700/94 |
| 7,899,565 | B1 * | 3/2011 | Johnston | 700/94 |
| 8,036,767 | B2 * | 10/2011 | Soulodre | 700/94 |
| 8,204,253 | B1 * | 6/2012 | Solbach | 381/94.7 |
| 8,774,423 | B1 * | 7/2014 | Solbach | 381/94.1 |
| 2005/0008169 | A1 * | 1/2005 | Muren et al. | 381/92 |
| 2005/0080616 | A1 * | 4/2005 | Leung et al. | 704/200.1 |
| 2005/0276363 | A1 * | 12/2005 | Joublin et al. | 375/350 |
| 2005/0281410 | A1 * | 12/2005 | Grosvenor et al. | 381/61 |
| 2007/0025562 | A1 * | 2/2007 | Zalewski et al. | 381/92 |
| 2007/0253574 | A1 * | 11/2007 | Soulodre | 381/94.2 |
| 2007/0287490 | A1 * | 12/2007 | Green et al. | 455/523 |
| 2008/0069366 | A1 * | 3/2008 | Soulodre | 381/63 |
| 2008/0111734 | A1 * | 5/2008 | Fam et al. | 342/195 |
| 2008/0247567 | A1 * | 10/2008 | Kjolerbakken et al. | 381/92 |
| 2009/0060222 | A1 * | 3/2009 | Jeong et al. | 381/92 |

(Continued)

OTHER PUBLICATIONS

International Search Report and Written Opinion dated Feb. 7, 2011 in Application No. PCT/US10/58600.

*Primary Examiner* — Lun-See Lao
(74) *Attorney, Agent, or Firm* — Carr & Ferrell LLP

(57) ABSTRACT

An audio equivalent of a video zoom feature for video recording and communication applications, as well as video post production processes. The audio zoom may operate in conjunction with a video zoom feature or independently. The audio zoom may be achieved by controlling reverberation effects of a signal, controlling a gain of the signal, as well as controlling the width of a directional beam which is used to select the particular audio component to focus on. The audio zoom may operate in response to user input, such as a user selection of a particular direction, or automatically based a current environment or other factors.

19 Claims, 7 Drawing Sheets

(56) References Cited

U.S. PATENT DOCUMENTS

2009/0303350 A1* 12/2009 Terada .................. 348/231.4
2009/0323982 A1* 12/2009 Solbach et al. .............. 381/94.3
2010/0245624 A1* 9/2010 Beaucoup .................. 348/231.4
2011/0038486 A1* 2/2011 Beaucoup ...................... 381/56
2011/0081024 A1* 4/2011 Soulodre .......................... 381/17
2011/0129095 A1* 6/2011 Avendano et al. .............. 381/63

* cited by examiner

AUDIO ZOOM

CROSS-REFERENCE TO RELATED APPLICATIONS

This application claims the benefit of U.S. Provisional Application Ser. No. 61/266,131, titled "Audio Zoom," filed Dec. 2, 2009, the disclosure of which is incorporated herein by reference.

BACKGROUND OF THE INVENTION

1. Field of the Invention

The present invention relates generally to audio processing, and more particularly to a noise suppression processing of an audio signal.

2. Description of Related Art

A common feature in video and images is a "zoom" function. When engaging a video zoom, a user of the product may either view a smaller portion of the screen as the full size image or "step back" and view a wider portion of the current image.

Currently, there is no "zoom" mechanism for an audio source within an audio signal containing multiple sources. A user may increase a volume of an audio signal, but this does not differentiate between different source directions within the received signal. There is a need for an audio zoom feature for audio signals.

SUMMARY OF THE INVENTION

The present technology provides an audio equivalent of a video zoom feature for video recording and communication applications, as well as video post-production processes. The audio zoom may operate in conjunction with a video zoom feature or independently. The audio zoom may be achieved by controlling reverberation effects of a signal, controlling a gain of the signal, as well as controlling the width and direction of a directional beam pointing towards the particular audio component to focus on. The audio zoom may operate in response to user input, such as a user selection of a particular direction, or automatically based on a current environment or other factors. An embodiment for performing audio zoom may receive one or more acoustic signals by one or more microphones on a device. Each acoustic signal may be associated with a spatial source within an environment. An indication of a spatial area within the environment may be received. The energy of acoustic signal components may be reduced. The acoustic signal components may be associated with a source positioned outside the spatial area. A reverberation level associated with acoustic signal components may be adjusted. The acoustic signal components may be associated with a source positioned inside the spatial area based on the indication.

An embodiment of a system for performing an audio zoom may include a memory, a beamformer module, and a reverb module. The beamformer module may be stored in the memory and executed by a processor to identify sub-band signals associated with an audio source within a spatial area associated with an audio source to zoom in. The reverb module stored in the memory and executed by a processor to cancel at least a portion of the sub-band signals.

Additionally, a computer readable storage medium may be implemented in which a program is embodied, the program being executable by a processor to perform a method for performing an audio zoom.

DETAILED DESCRIPTION OF THE INVENTION

The present technology provides an audio equivalent of a video zoom feature for video recording and communication applications, as well as video post-production processes. The audio zoom may operate in conjunction with a video zoom feature or independently. The audio zoom may be achieved by controlling reverberation effects of a signal, controlling a gain of the signal, as well as controlling the width and direction of a directional beam pointing towards the particular audio component to focus on. The audio zoom may operate in response to user input, such as a user selection of a particular direction, or automatically based on a current environment or other factors.

Figure 1:
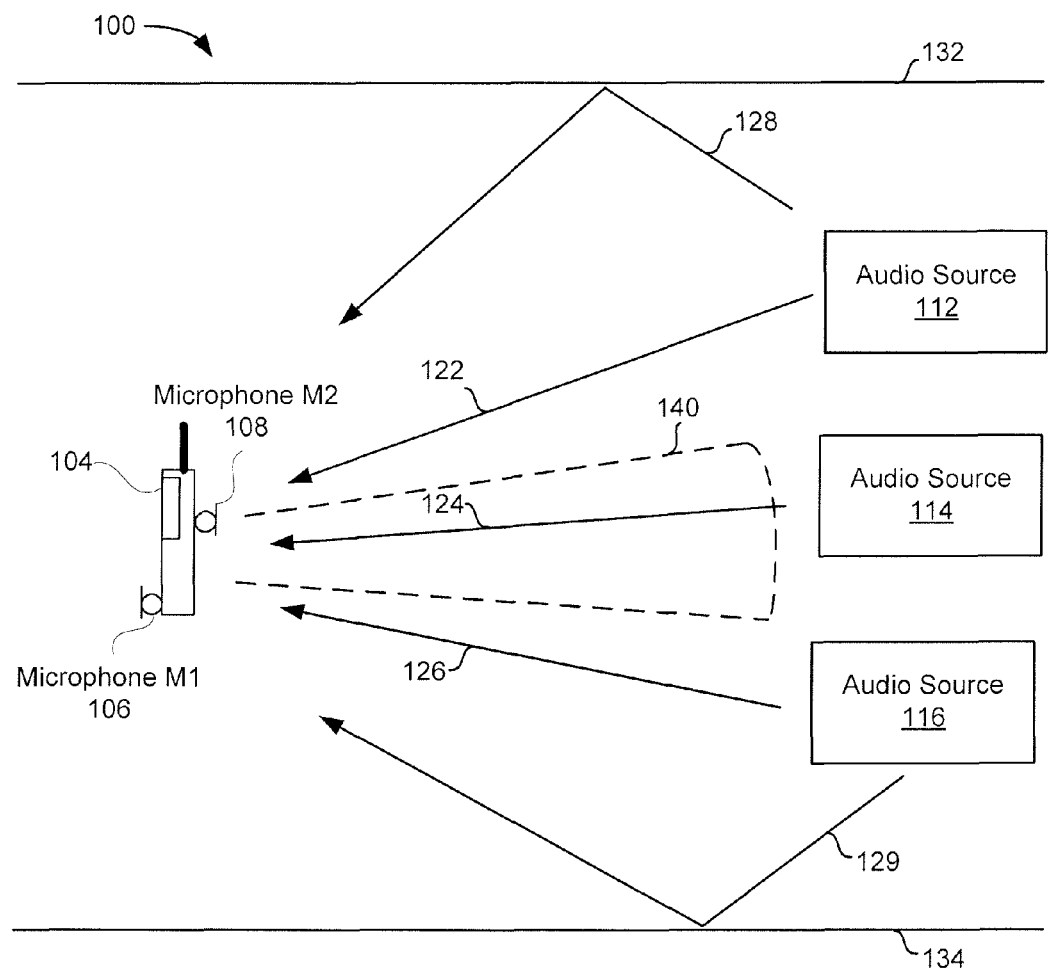
FIG. 1 is a block diagram of an exemplary environment in which the present technology can be used.

FIG. 1 is a block diagram of an exemplary environment 100 in which the present technology can be used. The environment 100 of FIG. 1 includes audio device 104, audio sources 112, 114 and 116, all within an environment having walls 132 and 134.

A user of a audio device 104 may choose to focus on or "zoom" into a particular audio source from the multiple audio sources within environment 100. Environment 100 includes audio source 112, 114, and 116 which all provide audio in a multidirectional audio, including towards audio device 104. Additionally, reflections from audio sources 112 and 116 as well as other audio sources may provide audio which reflects off the walls 132 and 134 of the environment and is directed at audio device 104. For example, reflection 128 is a reflection of an audio signal provided by audio source 112 and reflected from wall 132, and reflection 129 is a reflection of an audio signal provided by audio source 116 and reflected from wall 134, both of which travel towards audio device 104.

The present technology allows the user to select an area to "zoom." By performing an audio zoom on a particular area, the present technology detects audio signals having a source within the particular area and enhances those signals with respect to signals from audio sources outside the particular area. The area may be defined using a beam, such as for example beam 140 in FIG. 1. In FIG. 1, beam 140 contains an area that includes audio source 114. Audio sources 112 and 116 are outside the beam area. As such, the present technology would emphasize or "zoom" on the audio signal provided by audio source 114 and de-emphasize the audio provided by audio sources 112 and 116, including any reflections provided by environment 100, such as reflections 128 and 129.

The primary microphone 106 and secondary microphone 108 of audio device 104 may be omni-directional microphones. Alternatively embodiments may utilize other forms of microphones or acoustic sensors, such as directional microphones.

While the microphones 106 and 108 receive sound (i.e. acoustic signals) from the audio source 114, the microphones 106 and 108 also pick up noise from audio source 112. Although the noise 122 is shown coming from a single location in FIG. 1, the noise 122 may include any sounds from one or more locations that differ from the location of audio source 114, and may include reverberations and echoes. The noise 122 may be stationary, non-stationary, and/or a combination of both stationary and non-stationary noise.

Some embodiments may utilize level differences (e.g. energy differences) between the acoustic signals received by the two microphones 106 and 108. Because the primary microphone 106 is much closer to the audio source 116 than the secondary microphone 108 in a close-talk use case, the intensity level for noise 126 is higher for the primary microphone 106, resulting in a larger energy level received by the primary microphone 106 during a speech/voice segment, for example.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 2:
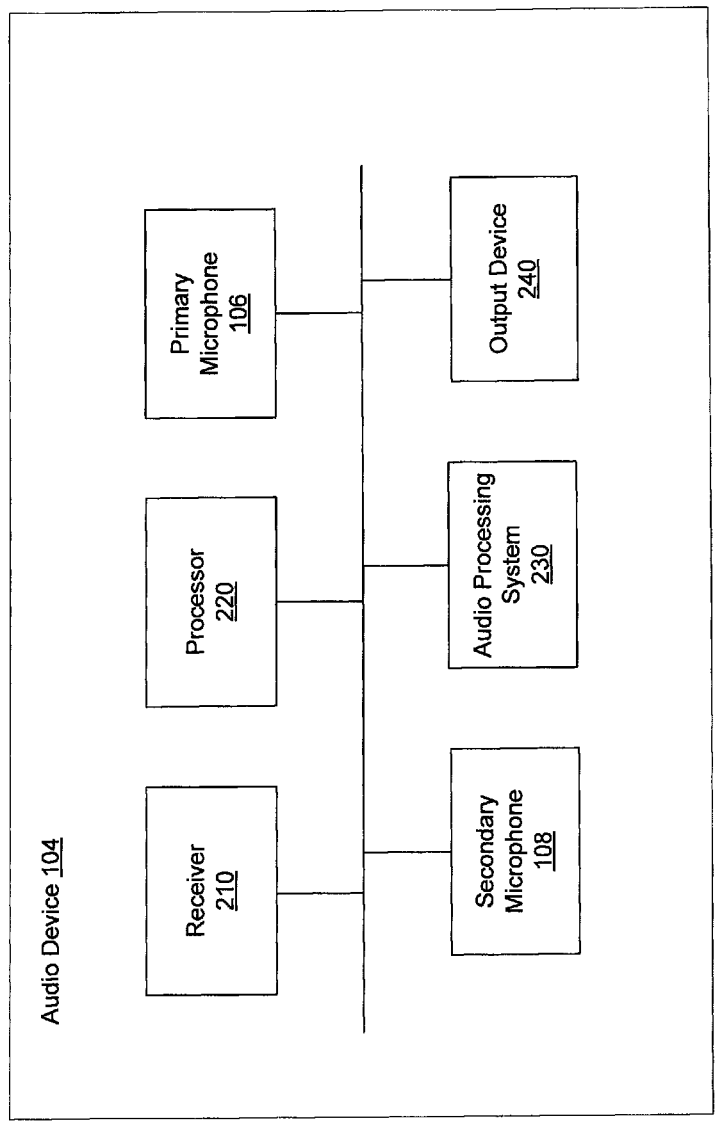
FIG. 2 is a block diagram of an exemplary audio device.

FIG. 2 is a block diagram of an exemplary audio device. In some embodiments, audio device of FIG. 2 provides more detail for audio device 104 of FIG. 1.

In the illustrated embodiment, the audio device 104 includes a receiver 210, a processor 220, the primary microphone 106, an optional secondary microphone 108, an audio processing system 230, and an output device 240. The audio device 104 may include further or other components necessary for audio device 104 operations. Similarly, the audio device 104 may include fewer components that perform similar or equivalent functions to those depicted in FIG. 2.

Processor 220 may execute instructions and modules stored in a memory (not illustrated in FIG. 2) in the audio device 104 to perform functionality described herein, including noise reduction for an acoustic signal. Processor 220 may include hardware and software implemented as a processing unit, which may process floating point operations and other operations for the processor 220.

The exemplary receiver 210 is an acoustic sensor configured to receive a signal from a communications network. In some embodiments, the receiver 210 may include an antenna device. The signal may then be forwarded to the audio processing system 230 to reduce noise using the techniques described herein, and provide an audio signal to the output device 240. The present technology may be used in one or both of the transmit and receive paths of the audio device 104.

The audio processing system 230 is configured to receive the acoustic signals from an acoustic source via the primary microphone 106 and secondary microphone 108 and process the acoustic signals. Processing may include performing noise reduction within an acoustic signal. The audio processing system 230 is discussed in more detail below. The primary and secondary microphones 106, 108 may be spaced a distance apart in order to allow for detecting an energy level difference, time difference or phase difference between them. The acoustic signals received by primary microphone 106 and secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 230 to produce a signal with an improved signal-to-noise ratio. It should be noted that embodiments of the technology described herein may be practiced utilizing only the primary microphone 106.

The output device 240 is any device which provides an audio output to the user. For example, the output device 240 may include a speaker, an earpiece of a headset or handset, or a speaker on a conference device.

In various embodiments, where the primary and secondary microphones are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
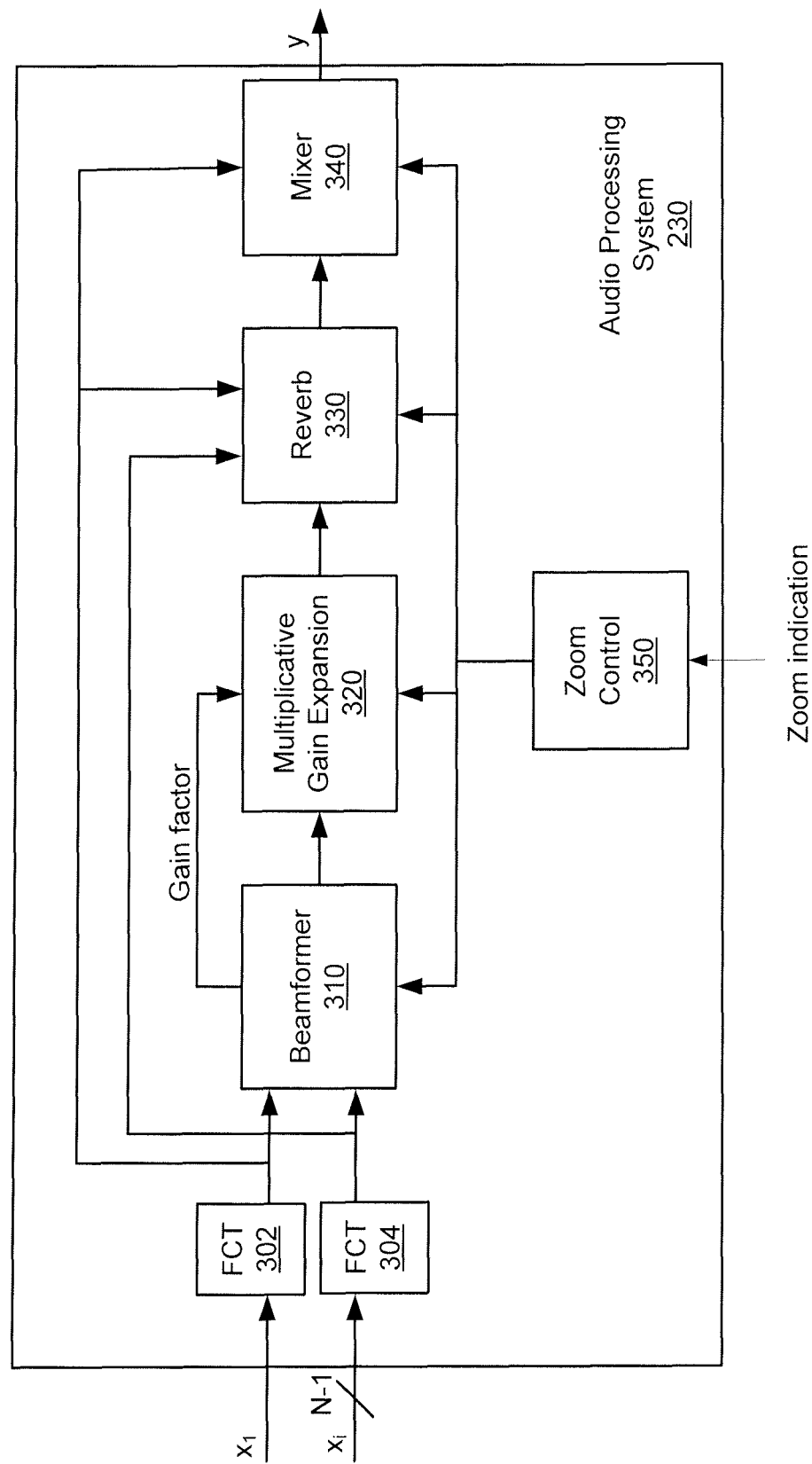
FIG. 3 is a block diagram of an exemplary audio processing system.

FIG. 3 is a block diagram of an exemplary audio processing system. The block diagram of FIG. 3 provides more detail for the audio processing system 230 in the block diagram of FIG. 2. Audio processing system 230 includes FCT modules 302 and 304, beam former module 310, multiplicative gain expansion module 320, reverb module 330, mixer module 340, and zoom control module 350.

FCT modules 302 and 304 may receive acoustic signals from audio device microphones and convert the acoustic signals to frequency range sub-band signals. FCT modules 302 and 304 may be implemented as one or more modules which create one or more sub-band signals for each received microphone signal. FCT modules 302 and 304 may receive an acoustic signal from each microphone contained in audio device 104. These received signals are illustrated as signals $X_1$-$X_I$, wherein $X_1$ is a primary microphone signal and $X_I$ represents the remaining microphone signals. The audio processing system 230 of FIG. 3 may perform audio zoom on a per frame and per sub band basis.

Beam former module 310 may receive the frequency sub-band signals as well as a zoom indication signal. The zoom indication is received from zoom control module 350. The zoom indication communicated by zoom indicator signal K may be generated in response to user input, analysis of a primary microphone signal or other acoustic signals received by audio device 104, a video zoom feature selection, or some other data. In operation, beam former module 310 receives sub-band signals, processes the sub-band signals to identify which signals are within a particular area to enhance (or "zoom"), and provide data for the selected signals as output to multiplicative gain expansion module 320. The output may include sub-band signals for the audio source within the area to enhance. Beam former module 310 also provides a gain factor to multiplicative gain expansion module 320. The gain factor may indicate whether multiplicative gain expansion module 320 should perform additional gain or reduction to the signals received from beam former module 310. In some embodiments, the gain factor is generated as an energy ratio based on the received microphone signals and components. The gain indication output by beam former module 310 is a ratio of how much energy that one has reduced in the primary versus an output energy. Hence, the gain may be a boost or cancellation gain expansion factor. The gain factor is discussed in more detail below.

Beam former module 310 can be implemented as a null processing noise subtraction (NPNS) module, multiplicative module, or a combination of these modules. Beam former module 310 may implement an array processing algorithm described below with respect to the beam former module of FIG. 4. When an NPNS module is used in microphones to generate a beam and achieve beam forming, the beam may be focused by narrowing constraints of alpha and gamma. For a rider beam, the constraints may be made larger. Hence a beam may be manipulated by putting a protective range around the preferred direction. Beam former module 310 may be implemented by a system described in the U.S. patent application No. 61/325,764, entitled "Multi-Microphone Robust Noise Suppression System," the disclosure of which is incorporated herein by reference. Additional techniques for reducing undesired audio components of a signal are discussed in U.S. patent application Ser. No. 12/693,998, entitled "Adaptive Noise Reduction Using Level Cues," the disclosure of which is incorporated herein by reference.

Multiplicative gain expansion module 320 receives the sub-band signals associated with audio sources within the selected beam, the gain factor from beam former module 310, and the zoom indicator signal. Multiplicative gain expansion module 320 applies a multiplicative gain based on the gain factor received. In effect, module 320 filters the beam former signal provided by beam former module 310.

The gain factor may be implemented as one of several different energy ratios. For example, the energy ratio may be the ratio of a noise reduced signal to a primary acoustic signal received from a primary microphone, the ratio of a noise reduce signal and a detected noise component within the primary microphone signal, the ratio of a noise reduce signal and a secondary acoustic signal, or the ratio of a noise reduce signal compared to the intra level difference between a primary signal and another signal. The gain factors may be an indication of signal strength in a target direction versus all other directions. Put another way, the gain factor may be an indication of multiplicative expansions due, and whether additional expansion or less expansion should be performed at the multiplicative gain expansion module 320. Multiplicative gain expansion module 320 outputs the modified signal and provides signal to reverb module 330 (which may also function to de-reverb).

Reverb module 330 receives the sub-band signals output by Multiplicative gain expansion module 320, as well as the microphone signals which were also received by beam former module 310, and performs reverberation or dereverberation to the sub-band signals output by Multiplicative gain expansion module 320. Reverb module 330 may adjust a ratio of direct energy to remaining energy within a signal based on the zoom control indicator provided by zoom control module 350.

Adjusting the reverb for a signal may involve adjusting the energy of different components of the signal. An audio signal has several components in a frequency domain, including a direct component, early reflections, and a tail component. A direct component typically has the highest energy level, followed by a somewhat lower energy level of reflections within the signal. Also included within a very particular signal is a tail which may include noise and other low energy data or low energy audio. A reverberation is defined as reflections of the direct audio component. Hence, a reverberation with many reflections over a broad frequency range account for a more noticeable reverberation. A signal with fewer reflection components has a smaller reverberation component.

Typically, the further away a listener is from an audio source, the larger the reverberation in the signal. The closer a listener is to an audio source, the smaller the intensity of the reverberation signal (reflection components). Hence, based on the zoom indicator received from zoom control module 350, reverb module 330 may adjust the reverberation components in the signal received from multiplicative gain expansion module 320. Hence, if the zoom indicator received indicates that a zoom in operation is to be performed on the audio, the reverberation will be decreased by minimizing the reflection components of the received signal. If the zoom indicator indicates that a zoom out is to be performed on the audio signal, the early reflection components are gained to increase these components to make it appear as if there is additional reverberation within the signal. After adjusting the reverberation of the received signal, reverb module 330 provides the modified signal to mixing module 340.

The mixing module 340 receives the reverberation adjusted signal and mixes the signal with the signal from the primary microphone. Mixing module 340 may increase the energy of the signal appropriately where there was audio present in the frame and decreased where there was little audio energy present in the frame.

Figure 4:
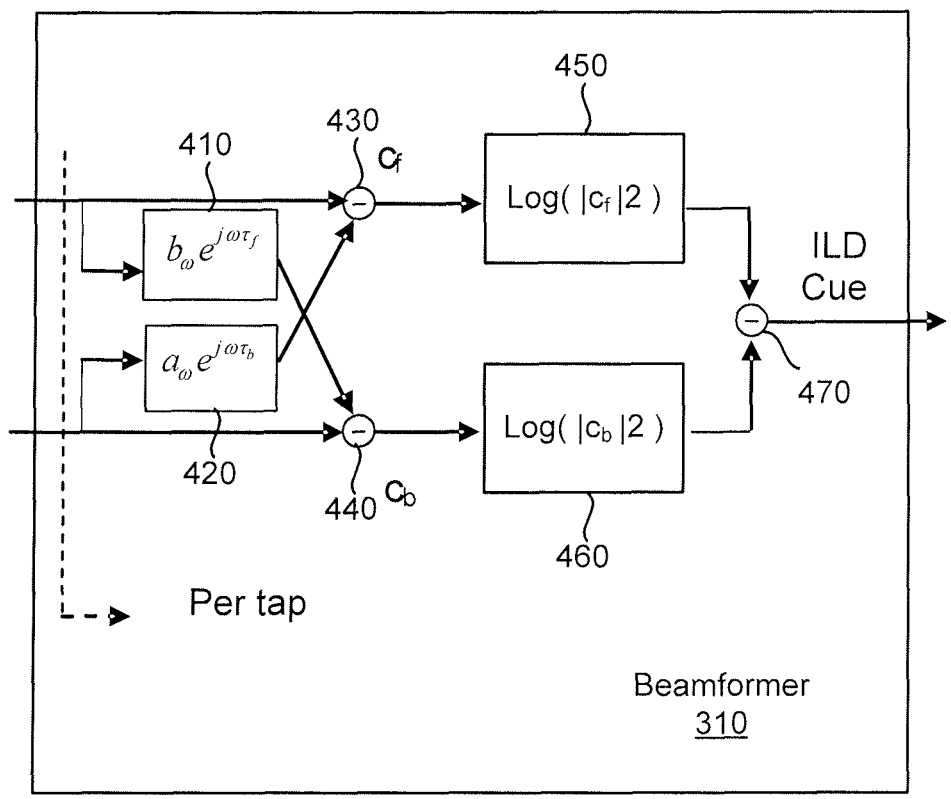
FIG. 4 is a block diagram of an exemplary beam former module

FIG. 4 is a block diagram of an exemplary beam former module. The beam former module 310 may be implemented per tap (i.e., per sub-band). Beam former module 310 receives FCT output signals for a first microphone (such as a primary microphone) and a second microphone. The first microphone FCT signal is processed by module 410 according to the function:

$b_\omega e^{j\omega\tau_f}$ to generate a first differential array with parameters.

The secondary microphone FCT signal is processed by module 420 according to the function:

$a_\omega e^{j\omega\tau_b}$ to generate a second differential array with parameters.

The output of module 410 is then subtracted from the secondary microphone FCT signal at combiner 440 and the output of module 420 is then subtracted by the primary microphone FCT signal at combiner 430. A cardioid signal $C_f$ is output from combiner 430 and provided to module 450 where the following function is applied:

$Log(|C_f|^2)$.

A cardioid signal $C_b$ is output from combiner 430 and provided to module 450 where the following function is applied:

$Log(|C_b|^2)$.

The difference of the outputs of modules 450 and 460 is determined 4 element 470 and output as an ILD cue. The ILD cue may be output by beam former module 310 to a post filter, for example a filter implemented by multiplicative gain expansion module 320.

Figure 5:
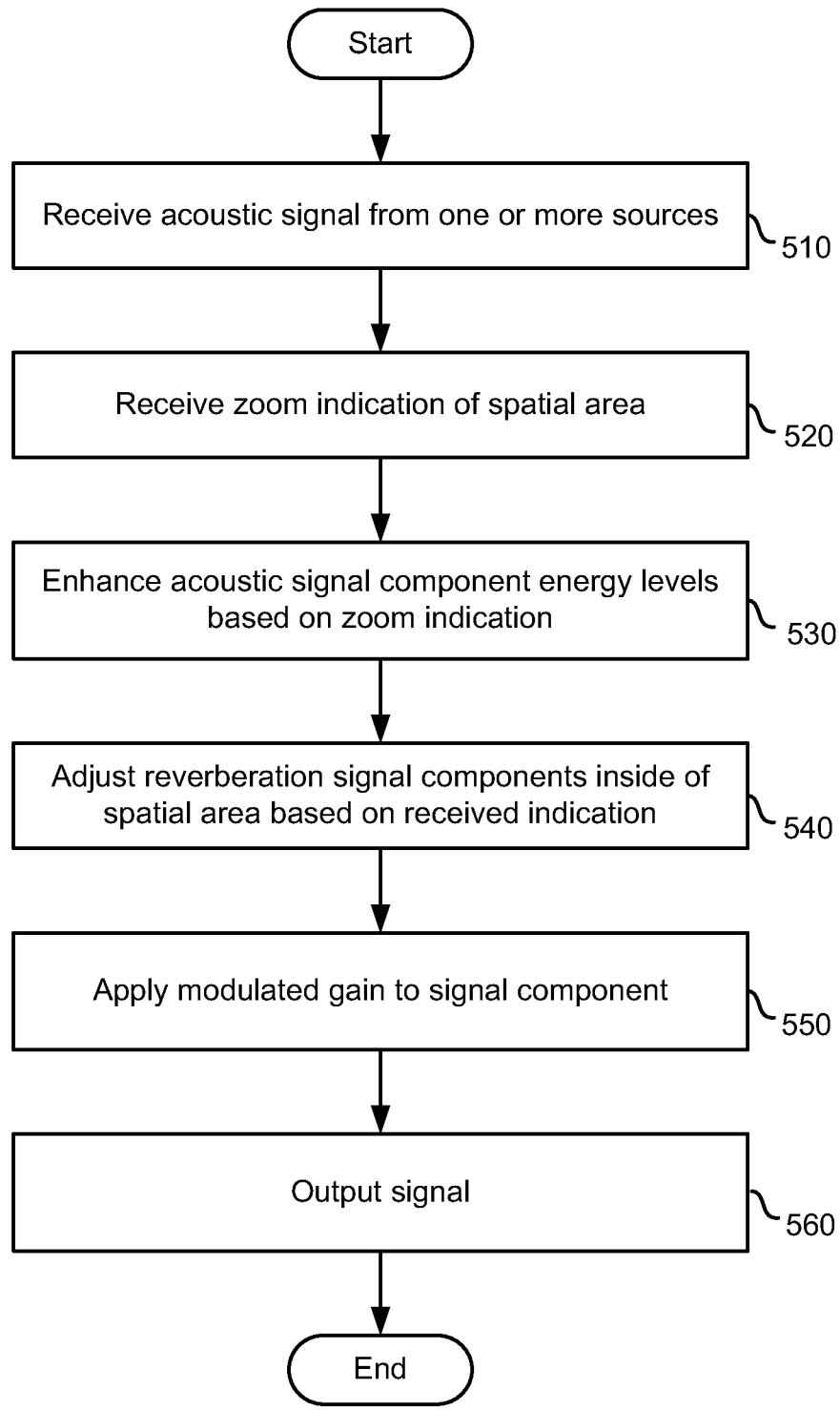
FIG. 5 is a flow chart of an exemplary method for performing an audio zoom.

FIG. 5 is a flow chart of an exemplary method for performing an audio zoom. An acoustic signal is received from one or more sources at step 510. The acoustic signals may be received through one or more microphones on audio device 104. For example, acoustic signals from audio sources 112-116 and reflections 128-129 may be received through microphones 106 and 108 of audio device 104.

A zoom indication is then received for a spatial area at step 520. The zoom indication may be received from a user or determined based on other data. For example, the zoom indication may be received from a user by one of a video zoom setting, pointing an audio device in a particular direction, an input for video zoom, or in some other manner.

Acoustic signal component energy levels may be enhanced based on the zoom indication at step 530. Acoustic signal component energy levels may be enhanced by increasing the energy levels for audio source sub-band signals that originate from a source device within a selected beam area. Audio signals from a device outside a selected beam area are de-emphasized. Enhancing acoustic signal component energy levels is discussed in more detail below with respect to the method of FIG. 6.

Reverberation signal components associated with a position inside the spatial area are adjusted based on the received indication at step 540. As discussed above, the adjustments may include modifying the ratio of a direct component with respect to reflection components for the particular signal. When a zoom in function is to be performed, reverberation should be decreased by increasing the ratio of the direct component to the reflection components in the audio signal. When a zoom out function is performed for the audio signal, the direct component is reduced with respect to the reflection components to decrease the ratio of direct to reflection components of the audio signal.

A modulated gain is applied to the signal component at step 550. The gain may be applied by mixing a reverb processed acoustic signal with a primary acoustic signal (or another audio signal received by audio device 104). The mixed signal which has been processed by audio zoom is in output at step 560.

Figure 6:
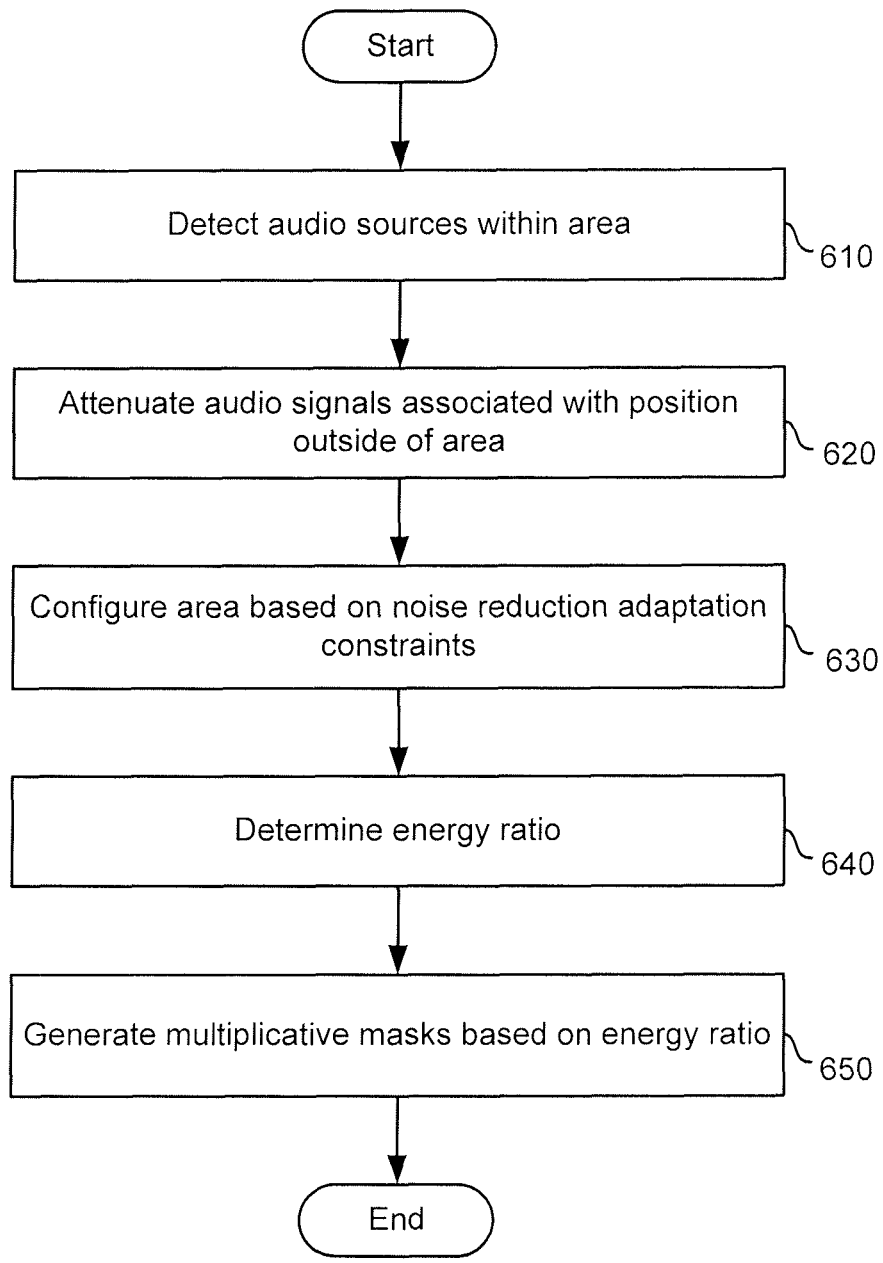
FIG. 6 is a flow chart of an exemplary method for enhancing acoustic signal components.

As discussed above, sub-band signals may be enhanced based on a zoom indication. FIG. 6 is a flow chart of an exemplary method for enhancing acoustic signal components. In some embodiments, the method in FIG. 6 provides more detail for step 530 of the method in FIG. 5. An audio source is detected in the direction of a beam at step 610. This may be performed by a null-processing noise subtraction mechanism or some other module that is able to identify a spatial position of a source based on audio signals received by two or more microphones.

Acoustic signal sources located outside the spatial area are attenuated at step 620. The acoustic sources outside the spatial area may include certain audio sources (e.g., 112 in FIG. 1) and reflected audio signals such as reflections 128 and 129. Adaptation constraints are then used to steer the beam based on the zoom indication at step 630. The adaptation constraints may include α and σ constraints used in a null processing noise suppression system. The adaptation constraints may also be derived from multiplicative expansion or selection of a region around a preferred direction based on a beam pattern.

Energy ratios are then determined at step 640. The energy ratios may be used to derive multiplicative masks that boost or reduce a beam former cancellation gain for signal components. Next, multiplicative masks are generated based on energy ratios at step 650. Generating multiplicative masks based on an energy ratio is discussed in more detail below with respect to the method of FIG. 7.

Figure 7:
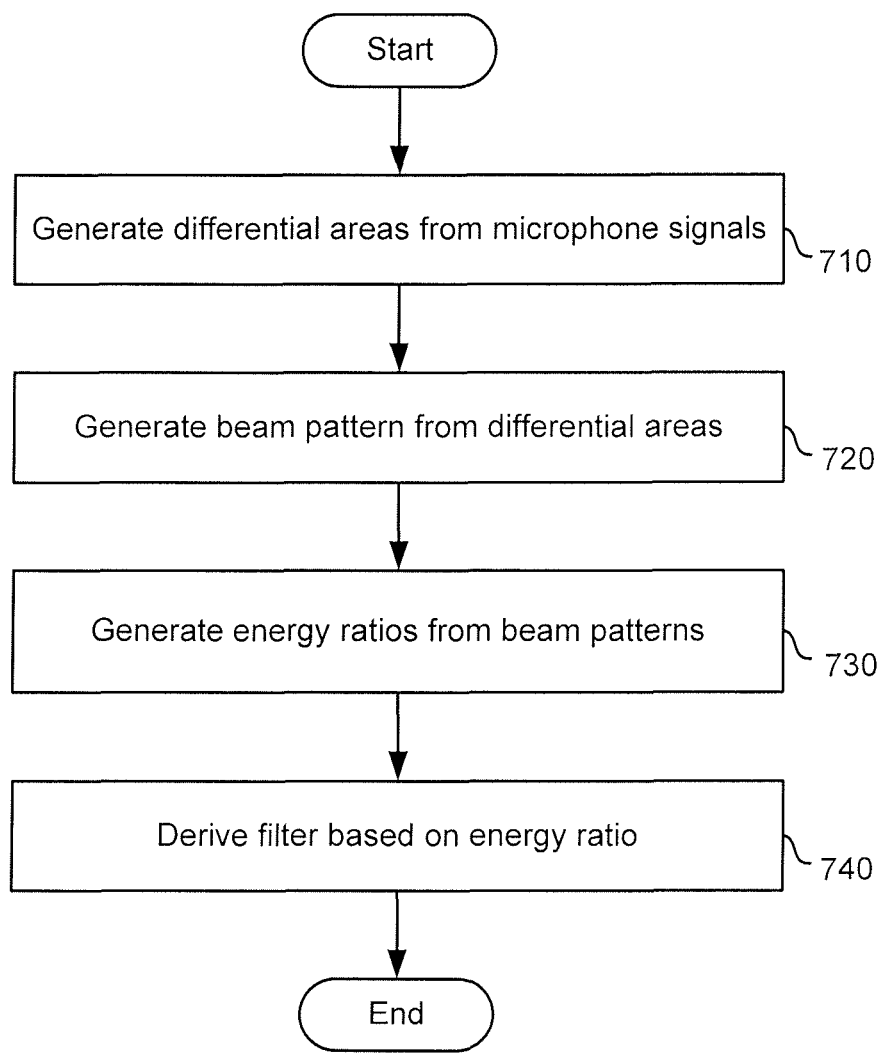
FIG. 7 is a flow chart of an exemplary method for generating a multiplicative mask.

FIG. 7 is a flow chart of an exemplary method for generating a multiplicative mask. The method of FIG. 7 provides more detail for step 650 in the method of FIG. 6. Differential arrays are generated from microphone signals at step 710. The arrays may be generated as part of a beam former module 310. The beam pattern may be a cardiod pattern generated based at least in part from the differential output signals. Next, a beam pattern is generated from the differential areas at step 720. Energy ratios are then generated from beam patterns at step 730. The energy ratios may be generated as any of a combination of signals. Once generated, an ILD map may be generated per frequency from energy ratios. An ILD range corresponding to the desired selection may be selected. An ILD window may then be applied to a map by boosting the signal components within the window and attenuating the signal components positioned outside the window. A filter, such as a post filter, may be derived from the energy ratio at step 740.

The above described modules, including those discussed with respect to FIG. 3, may include instructions stored in a storage media such as a machine readable medium (e.g., computer readable medium). These instructions may be retrieved and executed by the processor 220 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for processing a signal, comprising:
   receiving one or more acoustic signals captured by two or more microphones on a device;
   receiving an indication of a spatial area within an environment, the indication being received from a user of the device;
   based on the indication, determining adaptation constraints used to steer a beam, the adaptation constraints including constraints used in an audio noise suppression system;
   reducing, using at least one hardware processor, an energy of at least one first acoustic signal component of at least one of the acoustic signals, the at least one acoustic signal being associated with a first source positioned outside the spatial area, the reducing including forming the beam based on the indication, the energy of the at least one first acoustic signal component being reduced for the at least one acoustic signal associated with the first source positioned outside the beam; and
   adjusting a reverberation level associated with at least one second acoustic signal component of at least one other of the acoustic signals, the at least one other acoustic signal being associated with a second source positioned inside the spatial area based on the indication.

2. The method of claim 1, wherein forming the beam includes controlling a width of the beam.

3. The method of claim 1, wherein reducing the energy of the at least one first acoustic signal component is performed by subtractive cancellation.

4. The method of claim 1, wherein reducing the energy of the at least one first acoustic signal component is performed by multiplicative expansion or multiplicative cancellation.

5. The method of claim 1, wherein reducing the energy of the at least one first acoustic signal component includes selecting a region based on two or more fixed beam patterns.

6. The method of claim 1, wherein adjusting the reverberation level includes decreasing the reverberation level in response to the indication, the indication being to decrease the spatial area.

7. The method of claim 1, wherein adjusting the reverberation level includes increasing the reverberation level in response to the indication, the indication being to increase the spatial area.

8. The method of claim 1, further comprising applying a gain to the at least one second acoustic signal component of the at least one other acoustic signal, the at least one other acoustic signal being associated with the second source positioned inside the spatial area.

9. The method of claim 1, wherein the receiving of the indication of the spatial area within the environment from the user is by one of a video zoom setting, a pointing of an audio device in a particular direction, and an input for video zoom.

10. The method of claim 8, further comprising:
    detecting the second source is inside the spatial area by a null-processing noise subtraction mechanism;

determining energy ratios; and generating at least one multiplicative mask based on the energy ratios, the at least one multiplicative mask for adjusting the gain for the at least one second acoustic signal component of the at least one other acoustic signal.

11. The method of claim 10, wherein the generating of the at least one multiplicative mask based on the energy ratios comprises:

generating differential areas from the one or more acoustic signals;

generating a beam pattern from the differential areas, the beam pattern being used to determine the energy ratios; and deriving a filter from the energy ratios.

12. A non-transitory computer readable storage medium having embodied thereon a program, the program being executable by a processor to perform an audio zoom method, the method comprising:

receiving one or more acoustic signals captured by two or more microphones on a device;

receiving an indication of a spatial area within an environment, the indication being received from a user of the device;

based on the indication, determining adaptation constraints used to steer a beam, the adaptation constraints including constraints used in an audio noise suppression system;

reducing an energy of at least one acoustic signal component of at least one of the acoustic signals, the at least one acoustic signal being associated with a first source positioned outside the spatial area, the reducing including forming the beam based on the indication, the energy of the at least one acoustic signal component being reduced for the at least one acoustic signal associated with the first source positioned outside the beam; and adjusting a reverberation level associated with at least one second acoustic signal component of at least one other of the acoustic signals, the at least one other acoustic signal being associated with a second source positioned inside the spatial area based on the indication.

13. The non-transitory computer readable storage medium of claim 12, wherein forming the beam includes controlling a width of the beam.

14. The non-transitory computer readable storage medium of claim 12, wherein reducing the energy of the at least one first acoustic signal component is performed by subtractive cancellation.

15. The non-transitory computer readable storage medium of claim 12, wherein reducing the energy of the at least one first acoustic signal component is performed by multiplicative expansion or multiplicative cancellation.

16. The non-transitory computer readable storage medium of claim 12, wherein reducing the energy of the at least one first acoustic signal component includes selecting a region based on two or more fixed beam patterns.

17. The non-transitory computer readable storage medium of claim 12, wherein adjusting the reverberation level includes decreasing the reverberation level in response to the indication, the indication being to decrease the spatial area.

18. The non-transitory computer readable storage medium of claim 12, wherein adjusting the reverberation level includes increasing the reverberation level in response to the indication, the indication being to increase the spatial area.

19. A system for performing noise reduction in an audio signal, the system comprising:

a non-transitory memory;

a beamformer module stored in the memory and executed by a processor to identify subband signals associated with an audio source within a spatial area within an environment, the spatial area being indicated by a user input, the user input determining adaptation constraints used to steer a beam, the adaptation constraints including constraints used in an audio noise suppression system, an energy of at least one acoustic signal component of at least one of the acoustic signals being reduced, the at least one acoustic signal being associated with a first source positioned outside the spatial area, the reducing including forming the beam based on the indication, the energy of the at least one acoustic signal component being reduced for the at least one acoustic signal associated with the first source positioned outside the beam; and a reverb module stored in the memory and executed by a processor to cancel at least a portion of the sub-band signals.

* * * * *